US008280723B1

(12) United States Patent
Laaser (10) Patent No.: US 8,280,723 B1
(45) Date of Patent: Oct. 2, 2012

(54) TECHNIQUE FOR COMPARING A STRING TO LARGE SETS OF STRINGS

(75) Inventor: William T. Laaser, Palo Alto, CA (US)

(73) Assignee: Intuit Inc., Mountain View, CA (US)

( * ) Notice: Subject to any disclaimer, the term of this patent is extended or adjusted under 35 U.S.C. 154(b) by 918 days.

(21) Appl. No.: 12/362,293

(22) Filed: Jan. 29, 2009

(51) Int. Cl.
*G06F 17/21* (2006.01)

(52) U.S. Cl. .......................................... 704/10; 715/259

(58) Field of Classification Search ................ 704/1–10; 715/253, 259, 262, 263; 382/321
See application file for complete search history.

(56) References Cited

U.S. PATENT DOCUMENTS

| 5,406,281 A | * | 4/1995 | Klayman | 341/51 |
| 5,655,129 A | * | 8/1997 | Ito | 704/10 |
| 5,778,405 A | * | 7/1998 | Ogawa | 715/259 |
| 5,841,376 A | * | 11/1998 | Hayashi | 341/51 |
| 6,047,283 A | * | 4/2000 | Braun | 1/1 |
| 7,218,781 B2 | * | 5/2007 | van Meurs | 382/185 |

* cited by examiner

*Primary Examiner* — Abul Azad
(74) *Attorney, Agent, or Firm* — Park, Vaughan, Fleming & Dowler LLP; Steven E. Stupp (57) ABSTRACT

A comparison technique for efficiently comparing an input string to a set of strings is described. This set of strings may be represented in a tree structure as paths from a root of the tree structure to leaves of the tree structure, and strings in the set of strings that share common substrings share nodes in the tree structure. During the comparison technique, labels may be assigned to a given node in the tree structure based at least in part on comparisons between a given character in the input string and a character associated with the given node. These labels may include a position of the given character in the input string, and a cumulative error between the characters in a string that are associated with a branch in the tree structure and the characters in the input string that have been processed. Based at least in part on these labels, an actual string, which corresponds to the input string, may be identified.

23 Claims, 5 Drawing Sheets

TECHNIQUE FOR COMPARING A STRING TO LARGE SETS OF STRINGS

BACKGROUND

The present invention relates to techniques for comparing one or more input strings to large sets of strings in a dictionary.

A variety of comparison techniques are used to compare strings to determine their similarities. For example, an input string may be compared to a set of known strings (such as words in a dictionary), and the results of these comparisons may be used to correct data-entry errors.

However, as the complexity of the set of known strings increases (for example, as the number of words in the dictionary grows), there is typically a commensurate increase in the number of comparison operations. For example, if the input string has $n_1$ characters, an average string has $n_2$ characters, and there are $n_3$ strings to compare against the input string, the number of comparison operations is $n_1 \cdot n_2 \cdot n_3$. As $n_3$ increases, the number of comparisons becomes very large. This significantly increases the associated complexity and expense of the comparison operations, which often precludes the use of such comparison operations with large sets of strings.

SUMMARY

One embodiment of the present invention provides a computer system that compares an input string against a set of strings in a dictionary. A tree structure is created to represent the dictionary in which strings in the dictionary are represented as paths from the root of the tree to leaves of the tree, and strings in the dictionary that share common substrings (such as initial sequences of characters) share nodes in the tree. During operation, the computer system compares a first input character in the input string to a null character associated with a first node in a first level in the tree structure. Then, the computer system generates one or more first labels associated with the first node, where a given first label includes a first position in the input string, and a first cumulative error metric between the first input character and the null character.

Next, for a given character associated with a second node in a second level in the tree structure, which is in a given branch of the tree structure that depends from the first level, the computer system: compares a second input character in the input string to the given character; generates a second label associated with the second node and the given branch, where the second label includes a second position in the input string, and a second cumulative error metric between the input string and the characters in the given branch; and prunes the given branch if the second cumulative error metric exceeds a predefined value. These operations of comparing, generating and pruning are repeated by the computer system for the remaining nodes in the second level in one or more branches. Moreover, the computer system continues to repeat the operations of comparing, generating and pruning for additional nodes in the one or more branches that depend from the nodes in the second level until a termination condition occurs.

In some embodiments, the termination condition includes an absence of remaining branches with cumulative error metrics below the predefined value. Alternatively, the termination condition may include identifying an actual string, which corresponds to the input string, based at least in part on at least one of the branches that has an extremum value of the cumulative error metrics for nodes in a lowest considered level in the tree structure. For example, the extremum value may include the minimum value. Furthermore, the computer system may correct errors in the input string based at least in part on the identified actual string.

Note that the cumulative error metric may include a Levenshtein edit distance between at least some of the input characters in the input string and characters associated with the nodes in the given branch. When determining cumulative error metrics for nodes in the branches, the same values may be used for different potential errors, or different weights may be used for different potential errors. These different potential errors may be associated with different character operations, including: character insertion, character deletion, character substitution, and/or character transposition.

Moreover, the characters associated with the nodes in the tree structure may include: numbers, symbols and/or letters. These letters may include letters from an English-language alphabet and/or letters from a non-English-language alphabet.

When comparing an input string against the set of strings in the dictionary, the input characters in the input string may be analyzed in a direction proceeding from first to last or in another direction proceeding from last to first.

In some embodiments, input characters in multiple input strings are concurrently analyzed using the set of strings in the dictionary.

Another embodiment provides a method including at least some of the above-described operations.

Another embodiment provides a computer-program product for use in conjunction with the computer system.

BRIEF DESCRIPTION OF THE FIGURES

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a computer system, a method, and a computer-program product (e.g., software) for use with the computer system are described. These embodiments may be used to efficiently compare an input string to a set of strings, such as a dictionary. Note that the set of strings may be represented in a tree structure as paths from a root of the tree structure to leaves of the tree structure, and strings in the set of strings that share common substrings share nodes in the tree structure. During the comparison technique, labels may be assigned to a given node in the tree structure based at least in part on comparisons between a given character in the input string and a character associated with the given node. These labels may include a position of the given character in the input string, and a cumulative error between the characters in a string that are associated with a branch in the tree structure and the characters in the input string that have been processed. Based at least in part on these labels, an actual string, which corresponds to the input string, may be identified, which facilitates the correction of errors in the input string.

Because the nodes nearer the root of the tree represent substrings for many strings in the dictionary, this tree structure reduces the number of operations needed to compare the input string to the set of strings, thereby facilitating comparisons with sets of strings that include a large number of strings. Moreover, the associated complexity and expense are reduced, which allows the comparison technique to be used in a broader range of applications. In addition, the efficiency of the comparison technique and the tree structure may facilitate concurrent comparisons of multiple strings with the set of strings.

We now describe embodiments of a process for comparing an input string against a set of strings in a dictionary or, more generally, a corpus. This dictionary is 'compiled' into a tree structure that allows multiple strings in the dictionary to be compared to one or more input strings using fewer operations than would be needed with the original dictionary. In particular, the branches in the tree structure for different strings are common for as long as possible. Moreover, the individual strings in the dictionary can be reconstructed by traversing the tree structure from a root node to an appropriate leaf.

Figure 1A:
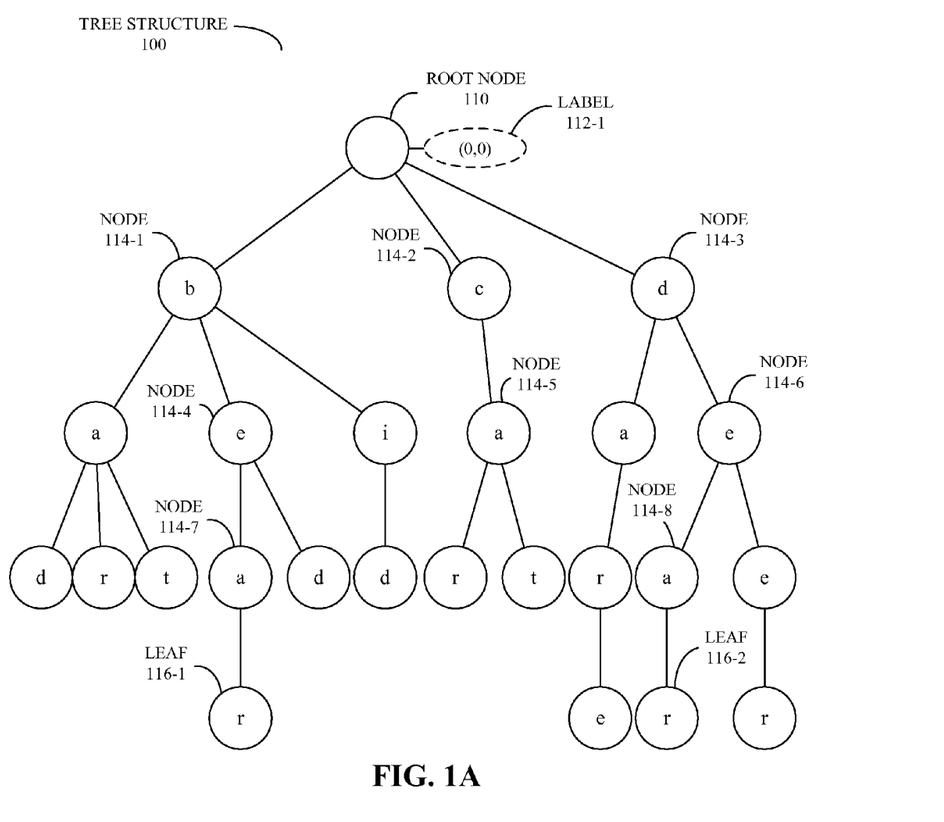
FIG. 1A is a drawing illustrating a tree structure that represents characters in strings in a set of strings in accordance with an embodiment of the present invention.

FIG. 1A presents a drawing illustrating a tree structure 100 that represents the set of strings: bad, bar, bat, bear, bed, bid, car, cat, dare, dear and deer. In this tree structure, characters associated with a given group of coupled nodes in tree structure 100 (such as nodes 114-1, 114-4 and 114-7 and leaf 116-1), which is referred to as a branch, correspond to a given string in the set of strings (in this case, 'bear'). Note that root node 110 has no characters associated with it because it represents a null character, and that every other node is associated with a corresponding character.

Comparing an input string to the set of strings can be performed by traversing tree structure 100. Because, in general, there may be errors in the input string, initially there is no single unique path or branch that can be traversed to identify the corresponding actual string (without the errors). Instead, several branches will be traversed. Note that the configuration of tree structure 100 implicitly allows at least portions of these branches to be traversed at the same time. Moreover, tree structure 100 can be used to concurrently compare multiple input strings to the set of strings.

When comparing a given input string to tree structure 100, one or more labels (such as label 112-1) are generated and associated with at least some of the nodes. Each label includes a pair of numbers: the first number indicates how many characters in the given input string have been processed to arrive at that node in tree structure 100; and the second number is the cumulative error metric for the characters in the branch up to and including the character associated with that node. For example, the cumulative error metric may be the penalty for the number of edits (which are also referred to as character operations) needed to convert the input string to the string represented by the characters up to and including that node in tree structure 100. In this comparison technique, note that nodes will often have multiple labels associated with them because different numbers of characters may be processed from the input string (including the possibility of missing characters or additional inserted characters) to get to each node in tree structure 100.

Figure 2:
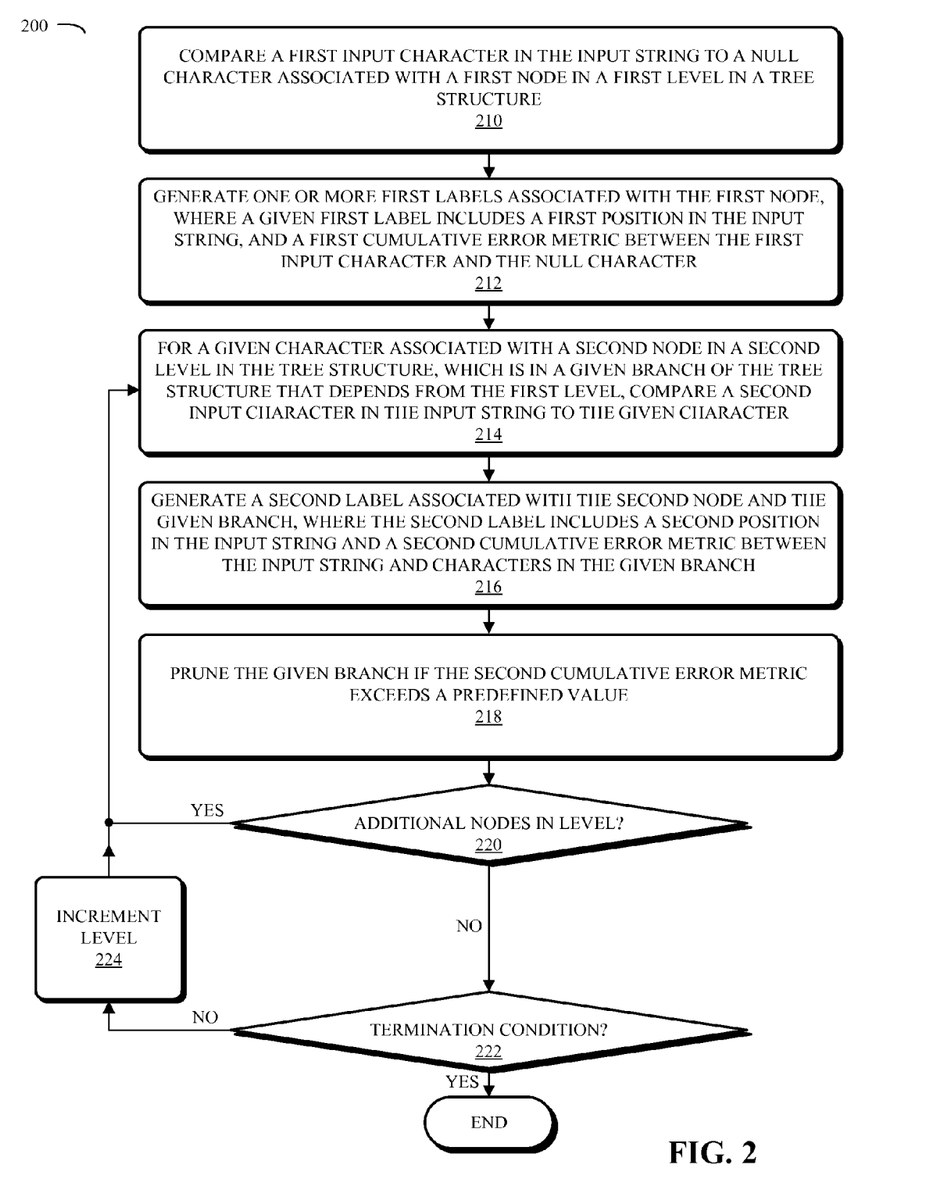
FIG. 2 is a flow chart illustrating a process for comparing an input string against the set of strings of FIG. 1A in accordance with an embodiment of the present invention.

FIG. 2 presents a flow chart illustrating a process 200 for comparing an input string against the set of strings in FIG. 1A. During operation, the computer system compares a first input character in the input string to a null character associated with a first node in a first level in the tree structure (210). Then, the computer system generates one or more first labels associated with the first node (212), where a given first label includes a first position in the input string, and a first cumulative error metric between the first input character and the null character.

Next, for a given character associated with a second node in a second level in the tree structure, which is in a given branch of the tree structure that depends from the first level, the computer system: compares a second input character in the input string to the given character (214); generates a second label associated with the second node and the given branch (216), where the second label includes a second position in the input string, and a second cumulative error metric between the input string and the characters in the given branch; and prunes the given branch if the second cumulative error metric exceeds a predefined value (218). These operations of comparing, generating and pruning are optionally repeated (220) by the computer system for the remaining nodes in the second level in one or more branches. Moreover, the computer system optionally continues to repeat the operations of comparing, generating and pruning for additional nodes in lower levels (224) in the one or more branches that depend from the nodes in the second level in the tree structure until a termination condition occurs (222).

When comparing an input string against the set of strings in the dictionary, the input characters in the input string may be analyzed in a direction proceeding from first to last or in another direction proceeding from last to first.

Moreover, the characters associated with the nodes in the tree structure may include a wide variety of information, such as: numbers, symbols and/or letters. These letters may include letters from an English-language alphabet and/or letters from a non-English-language alphabet.

In some embodiments, the termination condition includes an absence of remaining branches with cumulative error metrics below the predefined value. Alternatively, the termination condition may include identifying an actual string, which corresponds to the input string, based at least in part on at least one of the branches that has an extremum value of the cumulative error metrics for nodes in a lowest considered level in the tree structure. For example, the extremum value may include the minimum value (or, more generally, a range of values). Furthermore, the computer system may correct errors in the input string based at least in part on the identified actual string.

Additionally, in some embodiments input characters in multiple input strings are concurrently analyzed using the set of strings in the dictionary. One or more of these input strings may have been determined using an optical-character-recognition (OCR) technique or an intelligent-character-recognition (ICR) technique. OCR should be understood to include mechanical or electronic conversion of images of handwritten, typed or printed text (which may be captured by a scanner) into machine-editable text (and, more generally, digital data). Similarly, ICR should be understood to include handwriting-recognition systems that convert fonts and different styles of handwriting into machine-editable text (and, more generally, digital data). However, the input strings may be extracted from documents using a wide variety of pattern-recognition techniques.

Note that the first and second cumulative error metrics may include a Levenshtein edit distance between at least some of the input characters in the input string and characters associated with the nodes in the given branch. The Levenshtein edit distance should be understood to include a generalized metric for the difference between two strings (i.e., it is the so-called edit distance). In particular, the Levenshtein edit distance between two strings may be given by the minimum number of character operations needed to transform one string into the other. These character operations may include: an insertion of a character (character insertion), a deletion of a character (character deletion), a substitution of a character (character substitution), and/or a transposition of two or more characters (character transposition). When determining cumulative error metrics for nodes in the branches, the same values may be used for different potential errors, or different weights may be used for different potential errors. For example, the weights may be inversely related to the probability of occurrence of different potential errors.

While the Levenshtein edit distance is used as an illustrative example, a wide variety of error metrics (e.g., the Hamming distance) may be used as cumulative error metrics. Furthermore, as described in the example below, the cumulative number of errors in a given branch may range from at most one error in a branch to multiple errors. Consequently, the path lengths along the branches may be varied (for example, based at least in part on a user-specified value) when computing the cumulative error metrics. Therefore, in some embodiments, sequence detection (such as the Viterbi technique or maximum-likelihood detection) may be used when computing the cumulative error metrics.

In some embodiments of process 200, there may be additional or fewer operations. Moreover, the order of the operations may be changed, and/or two or more operations may be combined into a single operation.

In process 200 (which is sometimes referred to as the comparison technique), it is assumed that the dictionary has already been 'compiled' into a tree structure (such as tree structure 100 in FIG. 1A) because the dictionary is stable and a preprocessed dictionary allows multiple input strings to be processed over time. Therefore, it makes sense to 'compile' the dictionary once. In an exemplary embodiment, during the comparison technique, label 112-1 (FIG. 1A) associated with root node 110 (FIG. 1A) is initially (0,0), i.e., no characters in the input string have been processed and the cumulative error metric for root node 110 (FIG. 1A) with no characters having been processed is zero. (In the discussion that follows, a label associated with a node and a branch through the tree structure includes a 'count' portion, which tracks the number of characters in the input string that have been processed, and a 'score' portion, which tracks the cumulative error metric in the branch up to and including the character associated with the node.) At this point in the comparison technique, this is the only node with a label in tree structure 100 (FIG. 1A).

Then, while the termination condition has not been met, an unprocessed node and label in a given branch is selected for processing (which is referred to as the current node and label). Note that, in general, there may be more than one label associated with a given node because of different possible character operations at different locations in the input string that may convert the actual string into the input string. Moreover, information corresponding to the unprocessed nodes and labels may be stored in a priority queue to make the process of selecting the next unprocessed node and label more efficient.

A variety of techniques may be used to choose unprocessed nodes and labels for processing. If the objective is to find an unprocessed node and label that is most likely to lead to a successful agreement between the characters associated with a branch in tree structure 100 (FIG. 1A) and the input characters in the input string, an unprocessed node and label may be selected based at least in part on the lowest score or the lowest value of score/(count+1). For example, if multiple unprocessed nodes and labels have the same lowest score, then the node and label with the highest count may be selected. However, if multiple unprocessed nodes and labels have the same lowest score and the same highest count, then the node and label lowest in the tree structure (i.e., furthest from root node 110 in FIG. 1A) may be selected. Furthermore, if multiple unprocessed nodes and labels have the same lowest score, the same highest count and the same lowest level in tree structure 100 (FIG. 1A), then any of these nodes and labels may be selected.

For the current node and label, if the label is associated with an insert-character operation, the label may be revised to include an incremented value of count (relative to the previous node in this branch), and a new value of the score (where the new value of the score is the score from the previous node in this branch plus the contribution when the character associated with the current node is inserted). Note that if the count for the current node equals the number of characters in the input string and the associated score satisfies the match criteria (i.e., it is less than the predefined value), then the comparison technique may report the current node and label as a 'match' for the input string.

However, if the current node and label are associated with a character-substitution operation, the label may be revised to include an incremented value of count (relative to the previous node in this branch) plus one, and a new value of the score (where the new value of the score is the score from the previous node in this branch plus the contribution when the character associated with the current node replaces the count+$1^{th}$ character in the input string). Note that if these characters are the same, this contribution is zero.

These operations may be repeated for each child node and label that is coupled to the current node and label. Note that child nodes and labels that have scores exceeding the predefined value are removed or pruned, thereby truncating the associated branches in the tree structure.

A variety of termination conditions may be used in the comparison technique. For example, if the objective is to find all possible matches with a score below a certain threshold (such as the predefined value), then the termination condition may be that there are no more unprocessed nodes and labels with a score below the specified threshold. However, if the objective is to find the best match, then the termination condition may be that at least one 'match' has been reported, and that there are no more unprocessed nodes and labels with a score below the score for the reported 'match' result. Moreover, if the object is to find any reasonable match, then the termination condition may be that at least one 'match' has been reported for at least one of the nodes and labels in at least one branch.

Figure 1B:
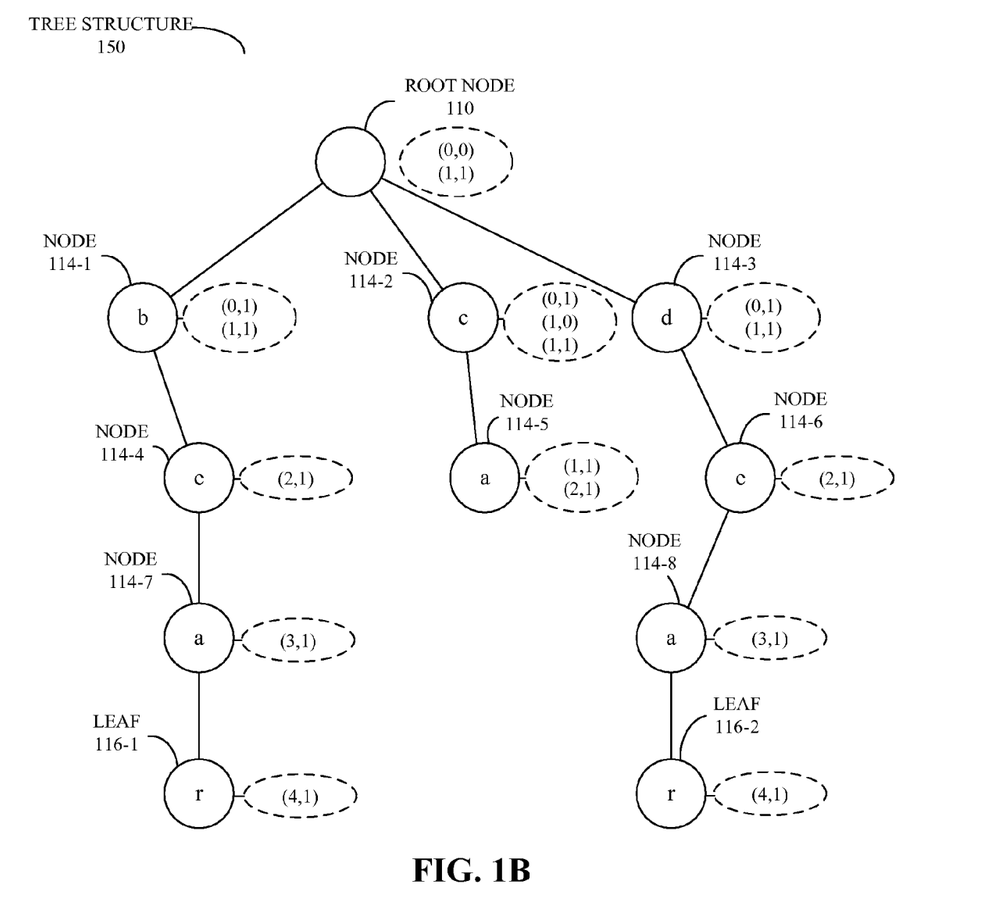
FIG. 1B is a drawing illustrating a tree structure that represents characters in strings in a set of strings in accordance with an embodiment of the present invention.

To illustrate the comparison technique, consider comparing an input string "cear" to the compiled dictionary in tree structure 100 (FIG. 1A). This is illustrated in FIG. 1B, which presents a drawing illustrating a tree structure 150 that represents the set of strings. In this example, an unprocessed node and label are selected based at least in part on the lowest score. Moreover, the predefined value of the cumulative error metric, which is determined using the Levenshtein-edit-distance technique, is two (i.e., Levenshtein edit distances or scores of zero or one are acceptable). Furthermore, the incremental penalty cost (i.e., the contribution to the cumulative error metric) for all character operations is one.

Initially, label 112-1 (FIG. 1A) for the root node 110 (FIG. 1A) is (0,0). Then, the root node 110 is processed. In addition to the label (0,0), another label (1,1) is associated with this node. This label assumes that the first position in the input string has already been processed and is missing (thus, there is automatically a contribution to the cumulative error metric).

Subsequently, as additional child nodes in the next level in tree structure 150 are processed, the following labels are added: (0,1) for node 114-1, (1,1) for node 114-1, (0,1) for node 114-2, (1,0) for node 114-2, (0,1) for node 114-3, and (1,1) for node 114-3. For example, for node 114-1, the first input character is either an extra character (i.e., an insertion), in which case zero characters in the input string have been processed and there is a contribution of '1' to the cumulative error metric (thus, a label of (0,1)), or the first input character is 'c,' while the character associated with node 114-1 is 'b,' so there is a contribution of '1' to the cumulative error metric (thus, a label of (1,1)).

Note that at this point, when selecting the next unprocessed node and label to process, there is only one node and label with a score of zero (label (1,0) for node 114-2, which corresponds to the agreement between the first input character and the character associated with node 114-2). When this node and label are processed, additional labels are generated: (1,1) for node 114-2, (1,1) for node 114-5 and (2,1) for node 114-5. Note that all the other remaining child nodes and labels in this branch that might have been generated at this point have a score greater than one, so these child nodes and labels are pruned.

Next, label (0,1) for node 114-2 is selected. Only one child node and label has a score less than or equal to one, label (2,1) for node 114-4.

This comparison technique continues until all the characters in the input string are processed, which results in the nodes and labels shown in FIG. 1B. Note that only two nodes (or, in this case, leaves 116-1 and 116-2) have labels with a count equal to the number of characters in the input string (in particular, a count of four) and a score less than two. Thus, there are two candidates from the set of strings which may be the actual string, 'bear' and 'dear.'

In some embodiments, the contribution to the cumulative error metric for replacing a 'c' with a 'd' is only 0.1 (instead of one) because it is likely that these two characters may be confused. In this case, node 114-3 and its child nodes may be processed before node 114-1 (in fact, in this case, node 114-1 and its child nodes may never be processed), which allows the actual string 'dear' to be identified.

Figure 3:
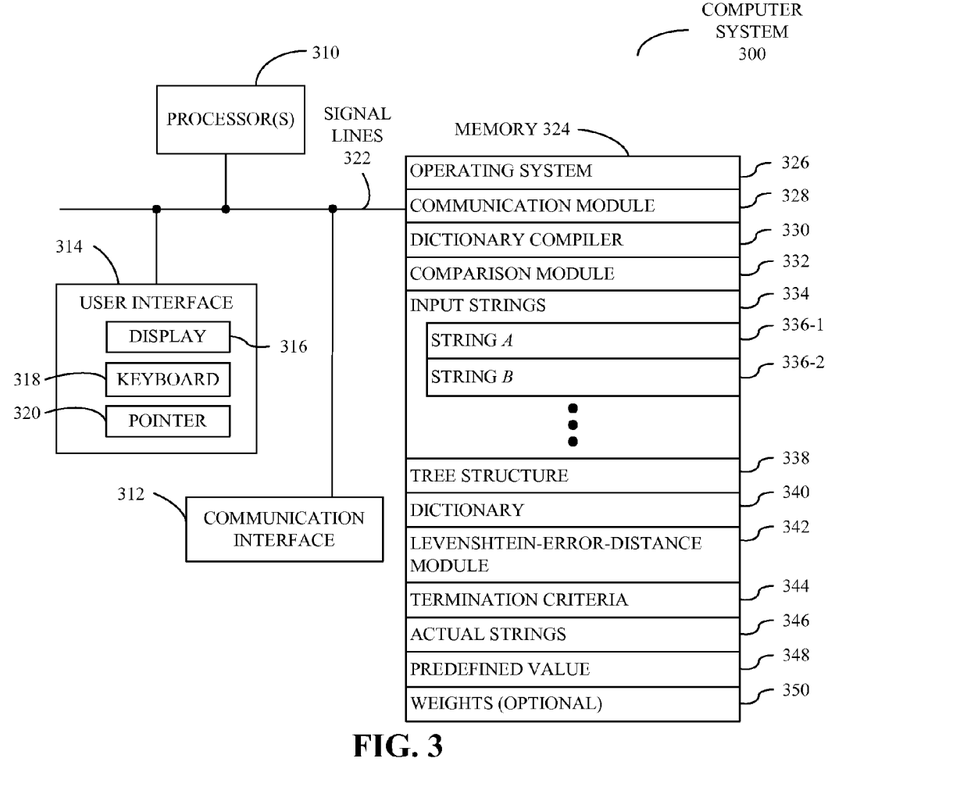
FIG. 3 is a block diagram illustrating a computer system that compares the input string against the set of strings of FIG. 1A in accordance with an embodiment of the present invention.

We now describe embodiments of a computer system that performs process 200 (FIG. 2). FIG. 3 presents a block diagram illustrating a computer system 300 that compares the input string against the set of strings of FIG. 1A. Computer system 300 includes one or more processors 310, a communication interface 312, a user interface 314, and one or more signal lines 322 coupling these components together. Note that the one or more processing units 310 may support parallel processing and/or multi-threaded operation, the communication interface 312 may have a persistent communication connection, and the one or more signal lines 322 may constitute a communication bus. Moreover, the user interface 314 may include: a display 316, a keyboard 318, and/or a pointer 320, such as a mouse.

Memory 324 in the computer system 300 may include volatile memory and/or non-volatile memory. More specifically, memory 324 may include: ROM, RAM, EPROM, EEPROM, flash memory, one or more smart cards, one or more magnetic disc storage devices, and/or one or more optical storage devices. Memory 324 may store an operating system 326 that includes procedures (or a set of instructions) for handling various basic system services for performing hardware-dependent tasks. Memory 324 may also store procedures (or a set of instructions) in a communication module 328. These communication procedures may be used for communicating with one or more computers and/or servers, including computers and/or servers that are remotely located with respect to the computer system 300, such as one of a variety of devices capable of manipulating computer-readable data or communicating such data between two or more computing systems over a network, including: a personal computer, a laptop computer, a mainframe computer, a portable electronic device (such as a cellular phone or PDA), a server and/or a client computer (in a client-server architecture). Moreover, communication module 328 may communication information via network, such as: the Internet, World Wide Web (WWW), an intranet, LAN, WAN, MAN, or a combination of networks, or other technology enabling communication between computing systems.

Memory 324 may also include multiple program modules (or sets of instructions), including: dictionary compiler 330 (or a set of instructions), comparison module 332 (or a set of instructions) and/or Levenshtein-error-distance module 342 (or a set of instructions). Dictionary compiler 330 may generate a tree structure 338 corresponding to dictionary 340. Then, comparison module 332 may process input strings 334, such as string A 336-1 and string B 336-2, based at least in part on predefined value 348 and/or one or more termination criteria 344 to identify actual strings 346. In some embodiments, comparison module 332 determines cumulative error metrics or scores using Levenshtein-error-distance module 342 and optional weights 350, which are associated with different character operations.

Note that input strings 334 may be associated with financial information, which may be associated with financial software, such as: Quicken™ and/or TurboTax™ (from Intuit, Inc., of Mountain View, Calif.), Microsoft Money™ (from Microsoft Corporation, of Redmond, Wash.), SplashMoney™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

Moreover, the financial software may include software such as: QuickBooks™ (from Intuit, Inc., of Mountain View, Calif.), Peachtree™ (from The Sage Group PLC, of Newcastle Upon Tyne, the United Kingdom), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™

(from Sage Software SB, Inc., of Lawrenceville, Ga.), Microsoft Money™ (from Microsoft Corporation, of Redmond, Wash.), and/or other payroll or accounting software capable of processing payroll information.

Instructions in the various modules in the memory 324 may be implemented in: a high-level procedural language, an object-oriented programming language, and/or in an assembly or machine language. Note that the programming language may be compiled or interpreted, e.g., configurable or configured, to be executed by the one or more processing units 310.

Although the computer system 300 is illustrated as having a number of discrete items, FIG. 3 is intended to be a functional description of the various features that may be present in the computer system 300 rather than a structural schematic of the embodiments described herein. In practice, and as recognized by those of ordinary skill in the art, the functions of the computer system 300 may be distributed over a large number of servers or computers, with various groups of the servers or computers performing particular subsets of the functions. In some embodiments, some or all of the functionality of the computer system 300 may be implemented in one or more application-specific integrated circuits (ASICs) and/or one or more digital signal processors (DSPs).

Computer system 300 may include fewer components or additional components. Moreover, two or more components may be combined into a single component, and/or a position of one or more components may be changed. In some embodiments, the functionality of the computer system 300 may be implemented more in hardware and less in software, or less in hardware and more in software, as is known in the art.

Figure 4:
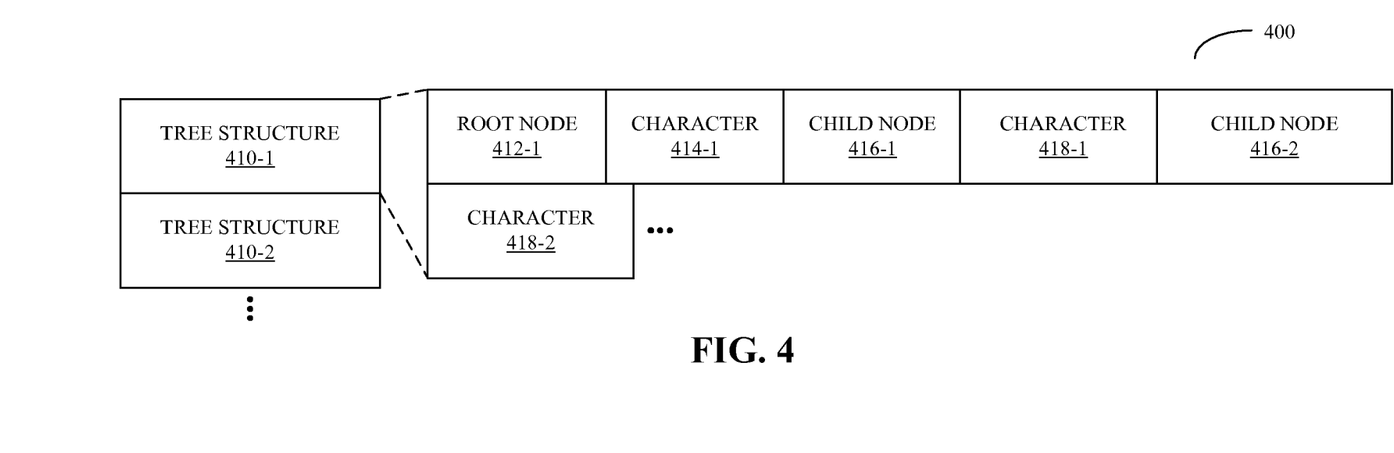
FIG. 4 is a block diagram illustrating a data structure in accordance with an embodiment of the present invention.

We now discuss data structures that may be used in computer system 300. FIG. 4 presents a block diagram illustrating a data structure 400. This data structure may include tree structures 410 for one or more sets of strings. For example, tree structure 410-1 may include: root node 412-1, character 414-1 associated with root node 412-1, child nodes 416 and associated characters 418 that are coupled to root node 412-1, and/or additional layers of child nodes and associated characters that are coupled to the child nodes 416.

Figure 5:
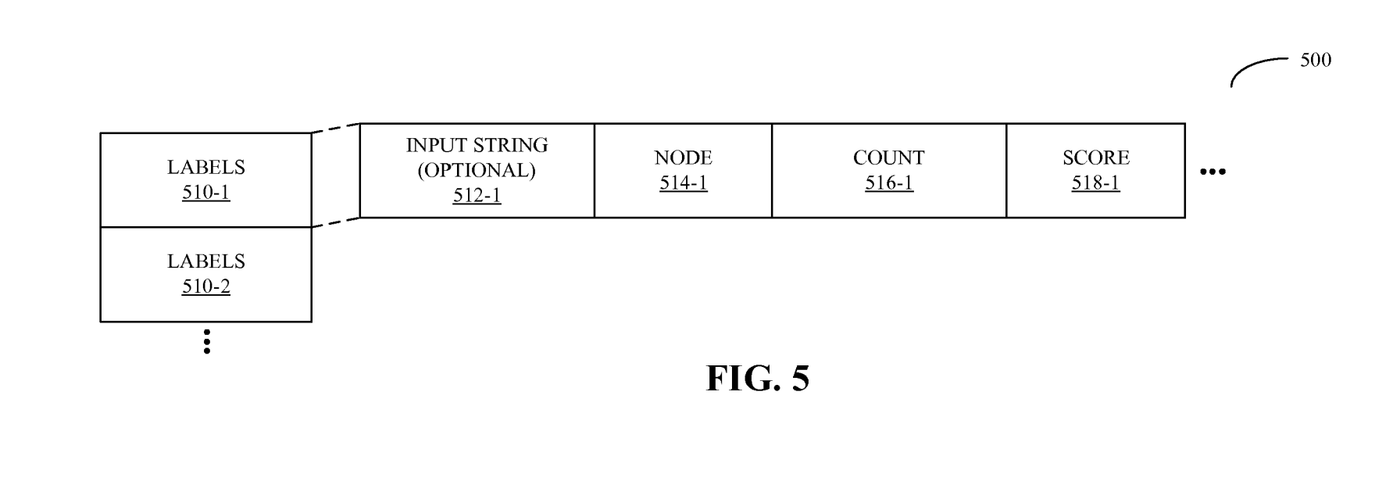
FIG. 5 is a block diagram illustrating a data structure in accordance with an embodiment of the present invention.

FIG. 5 presents a block diagram illustrating a data structure 500. This data structure may include labels 510 for one or more tree structures which are associated with nodes in a tree structure while one or more input strings are being processed. For example, labels 510-1 may include multiple groups of: nodes (such as node 514-1), counts (such as count 516-1) and scores (such as score 518-1) for one or more input strings (such as optional input string 512-1).

Note that in some embodiments of the data structures 400 (FIG. 4) and/or 500 there may be fewer or additional components. Moreover, two or more components may be combined into a single component, and/or a position of one or more components may be changed. While FIGS. 4 and 5 provide illustrative examples of data structures, in other embodiments a wide variety of data structures may be used to store this information.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method comparing an input string against a set of strings in a dictionary, wherein the dictionary is arranged in a tree structure in which the set of strings are represented as paths from a root of the tree structure to leaves of the tree structure, and strings in the set of strings that share common substrings share nodes in the tree structure, the method comprising:

comparing a first input character in the input string to a null character associated with a first node in a first level in the tree structure;

generating one or more first labels associated with the first node, wherein a given first label includes a first position in the input string, and a first cumulative error metric between the first input character and the null character;

for a given character associated with a second node in a second level in the tree structure, which is in a given branch of the tree structure that depends from the first level, performing the operations of:

comparing a second input character in the input string to the given character;

generating a second label associated with the second node and the given branch, wherein the second label includes a second position in the input string, and a second cumulative error metric between the input string and the characters in the given branch;

pruning the given branch if the second cumulative error metric exceeds a predefined value;

repeating the operations of comparing, generating and pruning for the remaining nodes in the second level in one or more branches; and continuing to repeat the operations of comparing, generating and pruning for additional nodes in the one or more branches that depend from the nodes in the second level until a termination condition occurs.

2. The method of claim 1, wherein the termination condition includes an absence of remaining branches with cumulative error metrics below the predefined value.

3. The method of claim 1, wherein the termination condition includes identifying an actual string, which corresponds to the input string, based at least in part on at least one of the branches that has an extremum value of cumulative error metrics for nodes in a lowest considered level in the tree structure.

4. The method of claim 3, wherein the extremum value includes the minimum value.

5. The method of claim 3, further comprising correcting errors in the input string based at least in part on the identified actual string.

6. The method of claim 1, wherein the first and second cumulative error metrics include a Levenshtein edit distance between at least some of the input characters in the input string and characters associated with the nodes in the given branch.

7. The method of claim 1, wherein different weights are used for different potential errors when determining cumulative error metrics for nodes in the branches.

8. The method of claim 1, wherein the same values are used for different potential errors when determining cumulative error metrics for nodes in the branches.

9. The method of claim 8, wherein the different potential errors are associated with different character operations.

10. The method of claim 9, wherein the different character operations include character insertion, character deletion, character substitution, or character transposition.

11. The method of claim 1, wherein the characters associated with the nodes in the tree structure include numbers, symbols or letters.

12. The method of claim 11, wherein the letters include letters from an English-language alphabet.

13. The method of claim 11, wherein the letters include letters from a non-English-language alphabet.

14. The method of claim 1, wherein the input characters in the input string are analyzed in a direction proceeding from first to last.

15. The method of claim 1, wherein the input characters in the input string are analyzed in a direction proceeding from last to first.

16. The method of claim 1, wherein input characters in multiple input strings are concurrently analyzed using the set of strings in the dictionary.

17. A computer-program product for use in conjunction with a computer system, the computer-program product comprising a non-transitory computer-readable storage medium and a computer-program mechanism embedded therein for comparing an input string against a set of strings in a dictionary, wherein the dictionary is arranged in a tree structure in which the set of strings are represented as paths from a root of the tree structure to leaves of the tree structure, and strings in the set of strings that share common substrings share nodes in the tree structure, the computer-program mechanism including:

instructions for comparing a first input character in the input string to a null character associated with a first node in a first level in the tree structure;

instructions for generating one or more first labels associated with the first node, wherein a given first label includes a first position in the input string, and a first cumulative error metric between the first input character and the null character;

for a given character associated with a second node in a second level in the tree structure, which is in a given branch of the tree structure that depends from the first level, instructions for performing the operations of:

comparing a second input character in the input string to the given character;

generating a second label associated with the second node and the given branch, wherein the second label includes a second position in the input string, and a second cumulative error metric between the input string and the characters in the given branch;

pruning the given branch if the second cumulative error metric exceeds a predefined value;

instructions for repeating the operations of comparing, generating and pruning for the remaining nodes in the second level in one or more branches; and instructions for continuing to repeat the operations of comparing, generating and pruning for additional nodes in the one or more branches that depend from the nodes in the second level until a termination condition occurs.

18. The computer-program product of claim 17, wherein the termination condition includes an absence of remaining branches with cumulative error metrics below the predefined value.

19. The computer-program product of claim 17, wherein the termination condition includes identifying an actual string, which corresponds to the input string, based at least in part on at least one of the branches that has an extremum value of cumulative error metrics for nodes in a lowest considered level in the tree structure.

20. The computer-program product of claim 19, further comprising instructions for correcting errors in the input string based at least in part on the identified actual string.

21. The computer-program product of claim 17, wherein the first and second cumulative error metrics include a Levenshtein edit distance between at least some of the input characters in the input string and characters associated with the nodes in the given branch.

22. The computer-program product of claim 17, wherein the characters associated with the nodes in the tree structure include numbers, symbols or letters.

23. A computer system, comprising:

a processor;

memory;

a program module, wherein the program module is stored in the memory and configured to be executed by the processor, the program module including instructions for comparing an input string against a set of strings in a dictionary, wherein the dictionary is arranged in a tree structure in which the set of strings are represented as paths from a root of the tree structure to leaves of the tree structure, and strings in the set of strings that share common substrings share nodes in the tree structure, the instructions including:

instructions for comparing a first input character in the input string to a null character associated with a first node in a first level in the tree structure;

instructions for generating one or more first labels associated with the first node, wherein a given first label includes a first position in the input string, and a first cumulative error metric between the first input character and the null character;

for a given character associated with a second node in a second level in the tree structure, which is in a given branch of the tree structure that depends from the first level, instructions for performing the operations of:

comparing a second input character in the input string to the given character;

generating a second label associated with the second node and the given branch, wherein the second label includes a second position in the input string, and a second cumulative error metric between the input string and the characters in the given branch;

pruning the given branch if the second cumulative error metric exceeds a predefined value;

instructions for repeating the operations of comparing, generating and pruning for the remaining nodes in the second level in one or more branches; and instructions for continuing to repeat the operations of comparing, generating and pruning for additional nodes in the one or more branches that depend from the nodes in the second level until a termination condition occurs.

* * * * *